United States Patent [11] 3,616,225

[72] Inventors: Masao Isono, Nishinomiya; Takeshi Takahashi, Suita, Osaka; Yoshio Yamasaki, Takarazuka; Takuichi Miki, Amagasaki, all of Japan
[21] Appl. No. 730,939
[22] Filed May 21, 1968
[45] Patented Oct. 26, 1971
[73] Assignee Takeda Chemical Industries, Ltd. Osaka, Japan
[32] Priority May 22, 1967
[33] Japan
[31] 42/32755

[54] PROCESS FOR PRODUCING UNSATURATED STEROIDS
8 Claims, No Drawings

[52] U.S. Cl. .................................................... 195/51 R, 260/586

[51] Int. Cl. .................................................... C07c 67/00
[50] Field of Search .......................................... 195/51, 51 A

[56] References Cited
UNITED STATES PATENTS

| | | | |
|---|---|---|---|
| 2,186,906 | 1/1940 | Mamoli | 195/51 |
| 3,102,080 | 8/1963 | Raspe et al. | 195/51 |
| 3,395,080 | 7/1968 | Greenspan | 195/51 |
| 3,481,974 | 12/1969 | Kraychy et al. | 195/51 |

Primary Examiner—Alvin E. Tanenholtz
Attorney—Wenderoth, Lind & Ponack

ABSTRACT: Compounds having a 13β-carbon-substituted-8,14-secogona-1,3,5(10),9(11)-tetraene-14,17-dione nucleus are reduced to the corresponding compound having a 13β-carbon-substituted-17α-hydroxy-8,14-secogona-1,3,5(10),9(11)-tetraene-14-one nucleus by the action of a yeast or a culture thereof. Yeasts of the genus Saccharomyces are advantageously used for this purpose.

PROCESS FOR PRODUCING UNSATURATED STEROIDS

The present invention relates to a process for producing unsaturated steroids.

More particularly, the present invention relates to a process for producing a compound having a 13β-carbon-substituted-17α-hydroxy-8,14-secogona-1,3,5(10),9(11)-tetraen-14-one nucleus through the utilization of micro-organisms belonging to the genera Kloeckera and Saccharomyces.

The compound having a 13β-carbon-substituted 17α-hydroxy-8,14-secogona-1,3,5(10),9(11)-tetraen-14-one nucleus, hereinafter sometimes referred to as compound (II), was found by Mike, one of the inventors and his coworkers, to be obtained as a racemic compound from a compound having a 13-carbon-substituted-8,14-secogona-1,3,5(10),9(11)-tetraene-14,17-dione nucleus, hereinafter sometimes referred to as compound (I), with the aid of a reducing agent such as sodium borohydride.

Therefore, in order that the compound having a 13β-carbon-substituted-17α-hydroxy-8,14-secogona-1,3,5(10),9(11)-tetraen-14-one nucleus may be obtained, optical resolution must be carried out at a suitable stage.

Belgian Pat. No. 686,841 discloses a process for producing 3-methoxy-17α-hydroxy-8,14-secoestra-1,3,5(10),9(11)-tetraen-14-one from 3-methoxy-8-14-secoestra-1,3,5(10),9(11)-tetraene-14,17-dione by a strain of *Astrobacter simplex*.

However, this process concomitantly gives comparable amounts of the enantiomer and requires further troublesome procedure of repeated fractional crystallization to purify the 17α-compound, resulting in a low yield.

The main object of the present invention is to provide a novel and industrially feasible process for producing compound (II) directly from compound (I) in a good yield.

The object of the present invention is realized by incubating a micro-organism belonging to the genus Kloeckera or Saccharomyces, contacting thus-obtained culture with a compound having a 13-carbon-substituted-8,14-secogonaH-1,3,5(10),9(AQ11)-tetraene-14,17-dione nucleus, and recovering the objective product from the reaction mixture.

The compound (I) employed as a starting material has a substituent at the 13-carbon, and may have one or two other substituents—oxygen-containing groups, halogen and/or lower alkyl—at any of the 1,2,3,4,6,7,11,12,15 and 16-positions.

The oxygen-containing groups include, for example, the hydroxyl group, lower acyloxy groups with 1 to 4 carbon atoms, and alkoxy groups containing 1 to 7 Xcarbon atoms, and the halogen groups mentioned above include, for example, fluorine and chlorine. The lower alkyl groups include straight chain or ring groups containing 1 to 5 carbon atoms each, and these groups may be substituted by oxygen-containing groups.

As the substituent at the 13-carbon of the compounds (I), there may be exemplified such lower alkyl as methyl, ethyl, propyl, butyl, etc. such aryl as phenyl, and such aralkyl (phenyl(lower)alkyl) as benzyl, phenethyl, phenylpropyl, etc.

Some typical examples of the starting compound of this invention are as follows.

8,14-Secoestra-1,3,5(10),9(11)-tetraene-14,17-dione,
3-Methoxy-8,14-secoestra-1,3,5(10),9(11)-tetraene-14,17-dione,
3-Ethoxy-8,14-secoestra-1,3,5(10),9(11)-tetraene-14,17-dione,
3-Methoxy-13-ethyl-8,14-secogonaH-1,3,5(10),9(11)-tetraene-14,17-dione,
3Ethoxy-13-ethyl-8,14-secogona-1,3,5(10),9(11)-tetraene-14,17-dione,
3-Methoxy-13-isopropyl-8,14-secogona-1,3,5(10),9(11)-tetraene-14,17-dione,
3-Ethoxy-13-isopropyl-8,14-secogona-1,3,5(10),9(11)-tetraene-14,17-dione,
3-Benzyloxy-8,14-secoestra-1,3,5(10),9(11)-tetraene-14,17-dione,
3-Methoxy-13-benzyl-8,14-secogona-1,3,5(10),9(11)-tetraene-14,17-dione,
3-Ethoxy-13-benzyl-8,14-secogona-1,3,5(10), 9(11)-tetaene-14,17-dione,
3-Methoxy-13-phenyl-8,14-secogona-1,3,5(10),9(11)-tetraene-14,17-dione,
3-Ethoxy-13-phenyl-8,14-secogona-1,3,5(10),9(11)-tetraene-14,17-dione,
2,3-Dimethoxy-13-ethyl-8,14-secogonaH-1,3,5(10),9(11)-tetraene-14,17-dione,
3-Methoxy-6-methyl-8,14-secoestra-1,3,5(10),9(11)-tetraene-14,17-dione,
3-Methoxy-6,6-dimethyl-8,14-secoestra-1,3,5(10),9(11)-tetraene-14,17-dione.

The micro-organisms which can be used in the method of this invention include *Kloeckera magna*, *Kloeckera jensenii*, *Kloeckera africana*, *Kloeckera javanica*, *Kloeckera antillarum*, *Kloeckera apiculata*, *Kloeckera corticis*, *Kloeckera lafarii*, *Kloeckera brevis*, *Kloeckera fluorescens*, *Kloeckera santacruzensis*, *Kloeckera willi*, *Saccharomyces exiquus*, *Saccharomyces acidifaciens*, *Saccharomyces bayanus*, *Saccharomyces cereuisiae*, *Saccharomyces delbrueckii*, *Saccharomyces formosensis*, *Saccharomyces italicus* and *Saccharomyces mangini*.

A micro-organism which belongs to the genus Kloeckera or Saccharomyces, or a culture thereof, is permitted to act upon a starting compound (I), thereby converting it to the objective compound (II).

Most generally, the micro-organism to be employed is cultivated in a conventional manner, and either after the micro-organism is separated from the culture broth or without resort to such a separation procedure, the starting compound (I) is brought into contact with the micro-organism. It is also advisable to cultivate the micro-organism on a culture medium containing the starting material, whereby both the cultivation of the micro-organism and the reduction of the starting compound (I) are simultaneously effected.

The nutritive media for the growth of such micro-organism include those containing the sources of carbon and nitrogen which can be utilized by the said micro-organism and the usual inorganic salts, various vitamins, and amino acids, etc. More specifically, the carbon sources include, for example, glucose, sucrose, dextrin, glycerol and others and the nitrogen sources include, for example, such organic nitrogenous materials as peptone, meat extract, casein, corn steep liquor, dry yeast and yeast extract and such inorganic nitrogenous materials as ammonium nitrate, ammonium phosphate, ammonium sulfate, sodium nitrate, and the like.

The above-mentioned inorganic salts include potassium sulfate, magnesium sulfate and the like. Those nutrients promoting the growth of micro-organism are employed in suitable proportion to make up a culture medium.

The culture method can be stationary culture, so-called shake culture or submerged culture with agitation and aeration.

Addition of starting compound (I) can be made either at the start of the cultivation, continuously or at intervals or at one stroke. The compound (I) can be employed in the form of fine powder or as a solution or suspension in a suitable solvent which includes, for example, acetone, ethanol, ethylene glycol, propylene glycol, dimethylformamide, dioxane and the like with or without addition of a surfactant, and the like.

The microbial cells obtained by incubation, or the reducing enzymes secured therefrom, can be suspended in a buffer solution of suitable pH and ionic strength or in water and, then, contacting the starting compound therewith so as to reduce the latter.

Usually the reaction proceeds at a pH from about 2 to about 11, and at a temperature somewhere between about 10° and about 50 ° C., advantageously between about 25° and 40°C for about 2 days. However, the optimum conditions vary with such factors as the starting compounds to be converted and micro-organism to be employed and it is advisable to select the optimum conditions in each particular situation.

The product having a 13β-substituted-17α-hydroxy-8,14-secogona-1,3,5(10X),9(11)-tetraen-14-one nucleus is accumulated in the reaction medium, and can be separated by various means.

By way of illustration, such separation methods are available as the adsorption means by which the end product is adsorbed on a suitable adsorbent, e.g. alumina, activated carbon, etc., followed by eluting with a suitable solvent such as methanol or ethanol; the means utilizing the difference in distribution coefficient between two liquid phases, for example, countercurrent distribution techniques, and conventional chromatographic techniques.

A compound having a 13-carbon-substituted-17α-hydroxy-8,14 -secogona-1,3,5(10),9(11)-tetraen-X 14-one nucleus, prepared as above, is converted to estrone or other 19-nor steroids, for example, by the method described in "Chemistry and Industry," 1966, p. 1340. According to the method of the present invention, the objective compound (II) is produced in a high yield from starting compound (I). Furthermore, since the end product is obtained as an optically active substance in contrast to the one obtained by the said metallic reduction, the complicated procedure of optical resolution is omitted. Thus, the method of the present invention is industrially quite advantageous.

Presently preferred embodiments of the invention are shown in the following examples, but these are not to be construed as limitations of the present invention.

Throughout the specification, the abbreviation "°C." means degrees centigrade, and percentages are calculated on the weight by volume basis.

The relationship between part(s) by weight and part(s) by volume is the same as that between gram(s) and milliliter(s).

EXAMPLE 1

An aqueous medium (pH 5.8) containing 40 parts by volume of a medium composed of
0.3% yeast extract, 0.5% peptone, 0.2% corn steep liHquor, 1.5% glucose, and 1.5% sucrose
is inoculated with 1 loop of the 7-day slant culture of *Kloeckera magna* (ATCC-20109) and incubated under shaking at 28° C. for 2 days. At the end of the incubation period 0.8 part by volume of ethanol containing 0.02 part by weight of 3-methoxy-8,14-secoestra-1,3,5(10),9(11)-tetraene-14,17-dione is added. The shake culture is continued at 28° C. for further 2 days. Then, the resulting culture broth is shaken twice along with an equivalent amount of ethyl acetate, and the ethyl acetate layer is washed with water, dried and concentrated to dryness.

The residue is subjected to column chromatography with silica gel.

From the benzene-acetone (a:1) eluate, the objective reduction product is obtained in pure form. The solvent is distilled off, and the residue is dissolved in ethanol. Measurement of the rotatory dispersion of the solution gives a negative $[\alpha]_D$ and a positive Cotton effect curve (first peak = 330 m$\mu$) in agreement with those of 3-methoxy-8,14-secoestra-1,3,5 (10),9(AQ11)-tetraen-17α-ol-14-one.

The infrared absorption spectrum of the same shows adsorption bands characteristic of hydroxyl and ketone.

Then, a large-scale culture is carried out in order to ascertain the physicochemical characteristics of the above reduction product.

Thus, 2,000 parts by volume of an aqueous medium containing
0.3% yeast extract, 0.15% peptone, 0.2% corn steep liquor, 5% glucose and 5% sucrose
are inoculated with 25 parts by volume of a 2-day culture of *Kloeckera magna* (ATCC-20109) and after the inoculated medium is incubated at 28° C. for 48 hours, 40 parts by volume of ethanol containing 1 part by weight of 3-methoxy-8,14-secoestra-1,3,5(10),9(11)-tetraene-14,17-dione is added. The cultivation is continued for additional 48 hours, at the end of which period the reaction product is extracted with ethyl acetate. The extract is purified by silica gel column chromatography. The product is crystallized from ethanol to give 0.42 part by weight of 17α-hydroxy-3-methoxy-8,14-secoestra-1,3,5(10), 9(11)-tetraen-14-one as colorless plates melting at 102° to 104° C.

Analysis (calculated for $C_{19}H_{24}O_3$-C, 75.97%, H, 8.05% found - C, 76.05%, H, 7.95%).

0.015 part by weight of the above product is dissolved in 2 parts by volume of methanol, and 0.5 part by volume of concentrated hydrochloric acid is added. The solution is refluxed for about 1 hour. The rotatory dispersion curve of the resulting ring-closed product is identical with that of 3-methoxy-1,3,5,8,14-estrapentaen-17α-ol.

EXAMPLE 2

In the same manner as example 1, a solution of 0.020 part by weight of 3-mdthoxy-8,14-secoestra-1,3,5(10),9(11)-tetraene-14,17-dione in 0.8 part by volume of ethanol is added to 80 parts by volume of a 2-day culture of *Kloeckera jensenii* (ATCC-20110)so that the reaction is effected at 28° C. for 48 Xhours. The reaction product is extracted with ethyl acetate and the extract is purified by silica gel column chromatography.

Measurement of the rotatory dispersion of 3 resulting product in ethanol gives a negative $[\alpha]_D$ and a positive Cotton effect curve (first peak = 329 m$\mu$).

EXAMPLE 3

In the same manner as example 1 , a solution of 0.020 part by weight of 3-methoxy-8,14-secoestra-1,3,5(10),9(11)-tetraene-14,17-dione in 0.8 part by volume of ethanol is reacted with 80 parts by volume of a 2-day culture of *Kloeckera africana* (ATCC-20111) for 48 hours. After the production of the objective compound has been confirmed by thin layer chromatography, the reaction product is purified by silica gel column chromatography.

The resulting pure oily product is dissolved in ethanol.

Measurement of the rotatory dispersion of the solution gives a negative $[\alpha]_D$ and a Cotton effect curve (first peak = 329 m$\mu$).

EXAMPLE 4

In the same manner as example 1, a solution of 0.020 part by weight of 3-methoxy-8,14-secoestra-1,3,5(10), 9(11)-tetraene- 14,17-dione in 1.6 parts by volume of ethanol is added to 80 parts by volume of a 2-day culture of *Kloeckera javanica* (ATCC-20112) so that the ratio is effected for 48 hours, at the end of which period the reaction product is extracted with ethyl acetate. The extract is purified by silica gel column chromatography.

Measurement of the rotatory dispersion of the product in ethanol gives a negative $[\alpha]_D$ and a positive Cotton effect curve (first peak = 329 m$\mu$).

EXAMPLE 5

In the same manner as example 1, a solution of 0.020 part by weight of 3-methoxy-8,14-secoestra-1,3,5(10),9(11) - tetraene-14,17-dione in 0.8 part by volume of ethanol is added to 80by volume of a 2-day culture of *Saccharomyces exiquus* (ATCC-20113) so that the reaction is effected for 48 hours. After the formation of the objective product is confirmed by thin layer chromatography, the product is purified by silica gel column chromatography and the resulting pure product is dissolved in ethanol.

Measurement of the rotatory dispersion of the solution gives a negative $[\alpha]_D$ and a positive Cotton effect curve (first peak = 330 m$\mu$).

EXAMPLE 6

In the same manner as example 1, a solution of 0.020 part by weight of 3-methoxy-13β-ethyl-8,14-secogona-1,3,5(10 ),9(11)-tetraene-14,17-dione in ethanol is added to 40 parts by volume of a 2-day culture of *Kloeckera magna* (ATCC- 20109) so that the reaction is effected at 28° C. for 2 days under shaking.

The reaction product is extracted with ethyl acetate and the extract is examined by thin layer chromatography.

The product is dissolved in 4 parts by volume of methanol, and the solution is refluxed with 0.5 part by volume of concentrated hydrochloric acid for 1 hour so that ring-closure may occur.

Measurement of the rotatory dispersion of this product gives a negative plain curve indicating that it is 3-methoxy-13β-ethyl-8,14-secogona-1,3,5(10),9(11)-tetraen-14-one-17α-ol.

What we claim is:

1. A process for producing a compound having a 13β-carbon-substituted 17α-hydroxy-8,14-secogona-1,3,5(10),9(11)-tetraen-14-one nucleus which comprises contacting a yeast of the genus Kloeckera or Saccharomyces, or a culture thereof, with a starting compound having a 13β-carbon substituted-8,14-secogona-1,3,5(10),9(11)-tetraene-14,17-dione nucleus, the 13β-carbon substituents being lower alkyl, phenyl or phenyl(lower)alkyl, subjecting the starting compound to the action of the yeast or culture thereof and recovering the objective product.

2. A process according to claim 1, wherein the yeast is *Kloeckera magna, Kloeckera jensenii, Kloeckera africana* or *Kloeckera javanica*.

3. A process according to claim 1, wherein the yeast is *Saccharomyces exiquus*.

4. A process according to claim 2, wherein the yeast is *Kloeckera magna* ATCC-20109.

5. A process according to claim 2 wherein the yeast is *Kloeckera jensenii* ATCC-20110.

6. A process according to claim 2, wherein the yeast is *Kloeckera africana* ATCC-20111.

7. A process according to claim 2, wherein the yeast is *Kloeckera javanica* ATCC-20112.

8. A process according to claim 3, wherein the yeast is *Saccharomyces exiquus* ATCC-20113.

* * * * *